United States Patent
Sundararajan et al.

(10) Patent No.: US 7,845,691 B2
(45) Date of Patent: Dec. 7, 2010

(54) COLLISION SAFETY SYSTEM FOR USE WITH A MOTOR VEHICLE

(75) Inventors: Srinivasan Sundararajan, Ann Arbor, MI (US); Joseph Mazur, Leonard, MI (US); Louis Brown, Oxford, MI (US)

(73) Assignees: Ford Global Technologies, LLC, Dearborn, MI (US); BGM Engineering, Inc., Shelby Township, MI (US)

( * ) Notice: Subject to any disclaimer, the term of this patent is extended or adjusted under 35 U.S.C. 154(b) by 519 days.

(21) Appl. No.: 11/278,737

(22) Filed: Apr. 5, 2006

(65) Prior Publication Data

US 2007/0246944 A1 Oct. 25, 2007

(51) Int. Cl.
*E05C 3/06* (2006.01)
*E05C 3/16* (2006.01)

(52) U.S. Cl. ............... 292/216; 292/201; 292/DIG. 23; 292/DIG. 65; 296/187.09; 180/274

(58) Field of Classification Search ................. 292/201, 292/216, DIG. 14, DIG. 23, DIG. 65; 296/187.09; 180/274
See application file for complete search history.

(56) References Cited

U.S. PATENT DOCUMENTS

| | | | | |
|---|---|---|---|---|
| 4,991,884 | A * | 2/1991 | Cairns | 292/28 |
| 5,404,257 | A * | 4/1995 | Alt | 360/256.4 |
| 5,802,894 | A * | 9/1998 | Jahrsetz et al. | 70/264 |
| 5,992,194 | A * | 11/1999 | Baukholt et al. | 70/279.1 |
| 6,014,876 | A | 1/2000 | Taylor | |
| 6,386,599 | B1 * | 5/2002 | Chevalier | 292/201 |
| 6,474,679 | B2 | 11/2002 | Miyasaka et al. | |
| 6,485,071 | B2 * | 11/2002 | Schwaiger | 292/216 |
| 6,499,555 | B2 | 12/2002 | Ishizaki et al. | |
| 6,510,914 | B2 | 1/2003 | Ishizaki et al. | |
| 6,571,901 | B2 | 6/2003 | Lee | |
| 6,581,987 | B1 * | 6/2003 | Gentile et al. | 292/216 |

(Continued)

FOREIGN PATENT DOCUMENTS

DE 19721565 * 12/1997

(Continued)

OTHER PUBLICATIONS

European Patent Office, Search Report for the corresponding European Patent Application No. 07105808.5-1264 mailed Jul. 1, 2009.

*Primary Examiner*—Carlos Lugo
(74) *Attorney, Agent, or Firm*—Frank A. MacKenzie; Brooks Kushman P.C.

(57) ABSTRACT

A collision safety system for use with a motor vehicle includes a hood mounted to the vehicle movable between an open position and a closed position. A latch mechanism positioned adjacent the hood releasably engages a striker bar extending from the hood. The latch mechanism includes a spring operative to move the striker bar, a locking cam configured to releasably secure the striker bar and a pawl disposed on a latch bracket is movable between a latched position engaging the locking cam and a deployed position away from the locking cam. A primary hood release device is operatively connected to the pawl and is in communication with a remote source that is configured to transmit an activation signal to the primary hood release device.

18 Claims, 2 Drawing Sheets

U.S. PATENT DOCUMENTS

| | | |
|---|---|---|
| 6,588,526 B1 | 7/2003 | Polz et al. |
| 6,802,556 B2 | 10/2004 | Mattsson et al. |
| 7,195,090 B2 * | 3/2007 | Parks et al. ................. 180/271 |
| 2004/0239139 A1 * | 12/2004 | Haunstetter ................. 296/76 |
| 2005/0156442 A1 | 7/2005 | Koppenhoehl et al. |
| 2006/0255595 A1 * | 11/2006 | Schretzlmeier et al. ....... 292/93 |
| 2007/0200359 A1 * | 8/2007 | Lewis et al. ................. 292/216 |

FOREIGN PATENT DOCUMENTS

| | | |
|---|---|---|
| DE | 19710417 * | 9/1998 |
| DE | 10343106 A1 | 10/2004 |
| DE | 10354158 A1 | 6/2005 |
| EP | 1350694 A1 | 10/2003 |
| EP | 1528201 A1 | 5/2005 |
| GB | 2387577 * | 10/2003 |
| WO | 2004110826 A1 | 12/2004 |

* cited by examiner

COLLISION SAFETY SYSTEM FOR USE WITH A MOTOR VEHICLE

BACKGROUND OF THE INVENTION

1. Field of the Invention

The present invention relates to a collision safety system for use in combination with a motor vehicle.

2. Background Art

Vehicle hoods are typically designed to cover an engine bay or storage area formed in a structural frame of a vehicle. Motor vehicle manufacturers shape the front hood line of a vehicle relatively low for visibility, aerodynamic and styling reasons. As a result, there is generally very little clearance between the vehicle hood and the structural frame. By design, the hood is generally deformable upon impact which provides an energy absorbing surface when mounted adjacent the generally rigid engine bay and structural frame.

Vehicle manufacturers have attempted to increase the cushioning effect of the vehicle hood when impacted by a pedestrian during an accident by varying the clearance between the hood and the underlying engine bay contents in an effort to reduce potential harm to the pedestrian. These systems include crash detection sensors and lifts which may adjust the position of the hood based on a detected impact. However, many common pedestrian accident detection systems are susceptible to detection of false readings and may fail to reset the position of the vehicle hood in such a case, especially solutions requiring the use of pyrotechnic devices to raise the vehicle hood.

It would be advantageous to provide a safety device for use in combination with the hood of a motor vehicle which increases pedestrian safety in the event of a collision while overcoming the limitations of the prior art safety systems. It would also be advantageous to provide one or more non-pyrotechnic safety devices and techniques for rapidly releasing the hood latch in response to a crash sensor signal that could be relatched upon detection of a false impact condition and reusable without a service call.

SUMMARY OF THE INVENTION

The present invention provides a collision safety system for use with a motor vehicle. The system includes a hood mounted to the vehicle movable between an open position and a closed position extending at least partially over an opening in the vehicle. A striker bar extends generally downward from the hood towards a latch mechanism.

A latch mechanism is positioned adjacent the hood and releasably engages the striker bar. The latch mechanism includes a spring operative to move the striker bar and a locking cam configured to releasably secure the striker bar. A pawl disposed on a latch bracket is movable between a latched position engaging the locking cam and a deployed position away from the locking cam.

A primary hood release device is operatively connected to the pawl is in communication with a remote source. The remote source may be one or more sensors disposed on the vehicle to detect an impact condition or a switch. The remote source is configured to transmit an activation signal to the primary hood release device.

A secondary hood release device may be disposed adjacent the hood and in communication with the remote source which is operable to move the hood to the opened position upon receipt of a signal from the remote source. The primary hood release device actuates to move the pawl to release the locking cam upon receipt of a signal from the remote source allowing the spring to engage and move the striker bar such that the hood moves upward relative to the vehicle body. The pawl may be repositioned to the latched position by the spring upon detection of a false impact condition for securement of the hood to the latch mechanism.

Other features and advantages of the present invention will be readily appreciated and better understood after reading the subsequent description when considered in connection with the accompanying drawings.

DETAILED DESCRIPTION OF THE PREFERRED EMBODIMENT(S)

Figure 1:
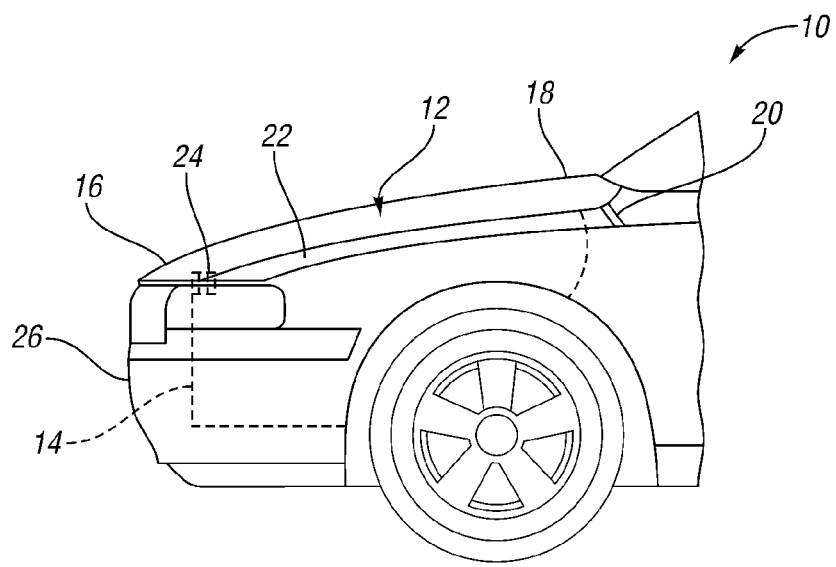
FIG. 1 is a perspective view of a vehicle incorporating a collision safety system in accordance with the present invention.

Now referring to the Figures, a collision safety system for use with a motor vehicle in accordance with the present invention is shown installed in a front portion of a vehicle. It is understood that a similar arrangement could be configured for use in a rear portion of the vehicle. A simplified side view of the system installed in a vehicle is shown in FIG. 1.

Vehicle 10 includes a hood 12 covering an engine compartment, shown in phantom as 14. Hood 12 is generally formed as a panel having a leading edge 16 and an opposing trailing edge 18. Hood 12 may be connected to the body of the vehicle 10 by hinges 20. In a closed position shown in FIG. 1, hood 12 is generally disposed adjacent and extends at least partially across an opening 22 in the body of vehicle 10 cooperating with engine compartment 14. Hood 12 is releasably connected to the vehicle body 10 by a latching mechanism 24 and is pivotable relative to the vehicle body to move between an open position and a closed position at least partially covering the engine compartment 14.

In the described example, it is assumed that latch mechanism 24 may be located adjacent the leading edge 16 of the hood and the hinges 20 may be located at the trailing edge 18 of hood 12. However, it is also possible to perform the functions of this invention while positioning the hinges adjacent the leading edge of the hood and the latch mechanism adjacent the trailing edge of the hood.

Vehicle 10 may be provided with a deformable forward section 26 extending generally forward of the leading edge 16 of hood 12 and engine compartment 14. It is contemplated that the forward section 26 will deform upon contact with an object in a collision to absorb the impact force associated with the collision. It is also contemplated that the leading edge 16 of the hood 12 may be designed to allow for deformation upon impact with an object should the vehicle not include a deformable forward section.

Figure 2:
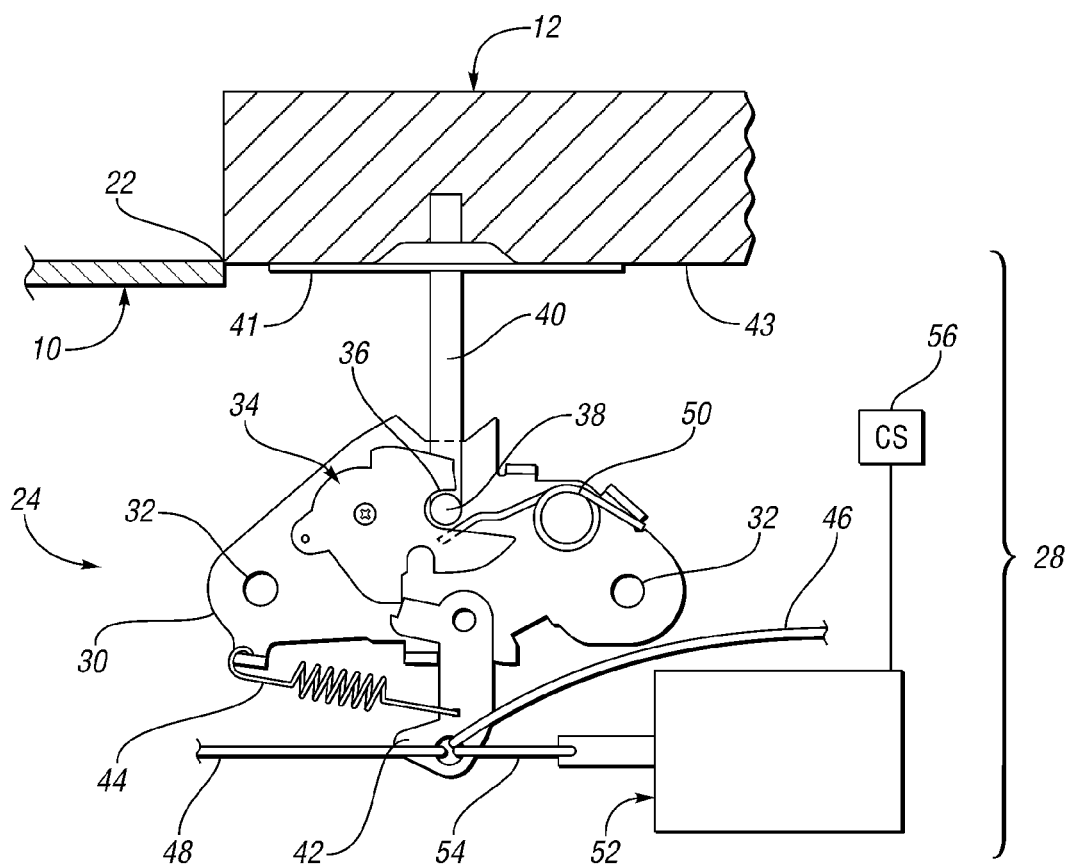
FIG. 2 is a front plan view of a safety device of the present invention shown in the latched position.

Referring now to FIG. 2, the safety device 28 of the collision safety system of the present invention is shown in a stored or latched position. Latch mechanism 24 includes a latch bracket 30 mountable to a portion of the vehicle body 10 or the engine compartment by fasteners (not shown) inserted through mounting holes 32. A locking cam 34 is pivotally mounted to latch bracket 30 and includes a channel 36 configured to receive a locking portion 38 of striker bar 40.

Striker bar 40 may extend generally vertically downward from the hood 12 or other desirable position. Striker bar 40 may be mounted to a support bracket 41 disposed on an underside or inner surface 43 of the hood 12. When the hood 12 is moved to the closed or latched position, the locking portion 38 of striker bar 40 engages the locking cam 34, causing locking cam 34 to rotate about latch bracket 30.

Latch mechanism 24 includes a pawl 42 pivotally connected to the latch bracket 30. Spring 44 cooperates with pawl 42 and latch bracket 30 to allow pawl to move between a latched position and an unlatched position. A description of this interaction will be described in greater detail below. As locking cam 34 rotates, locking portion 38 of striker bar 40 moves through channel 36. Pawl 42 is configured to receive and engage a portion of the locking cam 34 to limit the travel of locking cam 34 between a latched position wherein the striker bar 40 is received in the locking cam 34 and a deployed position wherein the striker bar 40 is disengaged from the locking cam 34.

In one aspect of the present invention, vehicle 10 includes a cable 46 allowing a vehicle operator to manually activate pawl 42 to open hood 12. It is contemplated that the vehicle may have two latch mechanisms to ensure uniform retention of the hood adjacent the vehicle body. A secondary cable 48 may be connected to pawl 42 and the pawl of the second latch mechanism to translate activation of cable 46 to the second latch mechanism.

When activated, pawl 42 rotates to an angle sufficient to release its engagement with the locking cam 34. When released, a hood lift spring 50 engages the striker bar 40, forcing the striker bar upward relative to the latch mechanism and vehicle body. The resultant movement of the pawl 42 causes locking cam 34 to rotate counter-clockwise. The upward movement of the striker bar causes hood 12 to move upward relative to the vehicle body. In yet another aspect of the invention, a spring loaded stop limits travel of the hood to about 3 inches above the vehicle body.

Safety device further includes a primary hood release device 52 disposed adjacent latch mechanism 24. In a preferred aspect of the present invention, the primary hood release device is a voice coil actuator 52 operatively connected to pawl 42 by cable or link 54. It is understood that a variety of non-pyrotechnic devices may also be used as a primary hood release device, including a spring or pneumatic piston. Voice coil actuator 52 is configured to move pawl 42 upon detection of an activation signal from a remote source.

In one aspect of the present invention, the remote source comprises one or more crash sensors 56 which sense an impact condition and transmit a signal to the primary hood release device or voice coil actuator 52 upon detection of a collision. In another aspect of the present invention, the remote source comprises a switch in the passenger compartment of the vehicle which transmits a signal to the voice coil actuator 52. It is also contemplated that the primary hood release device or voice coil actuator may function independently or in parallel with the manual release cable 46 to operate one or more latch mechanisms.

Figure 3:
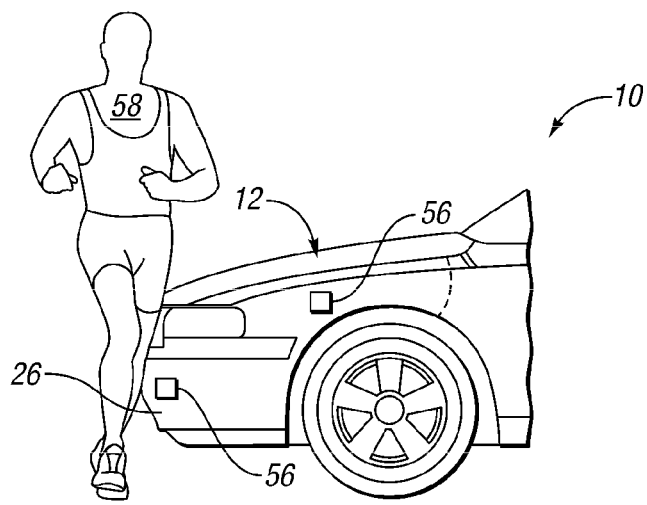
FIG. 3 is a perspective view of a vehicle with the safety device and vehicle hood shown in the deployed position.
Figure 4:
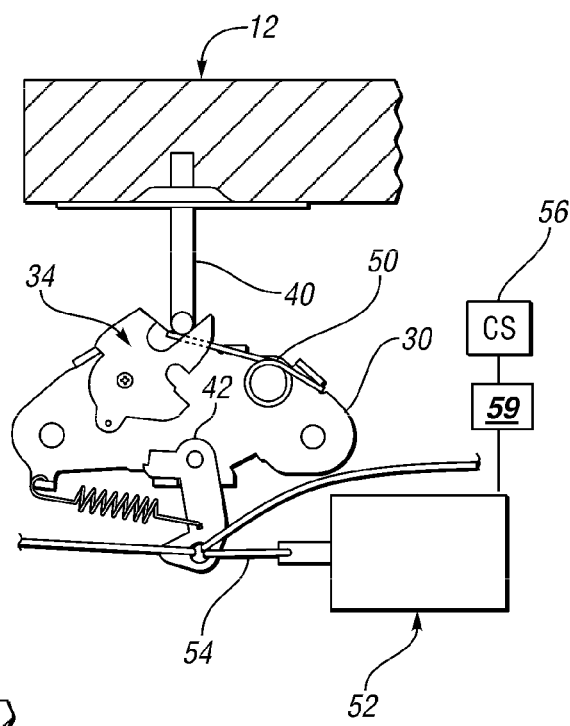
FIG. 4 is a front plan view of the safety device shown in the deployed position.
Figure 5:
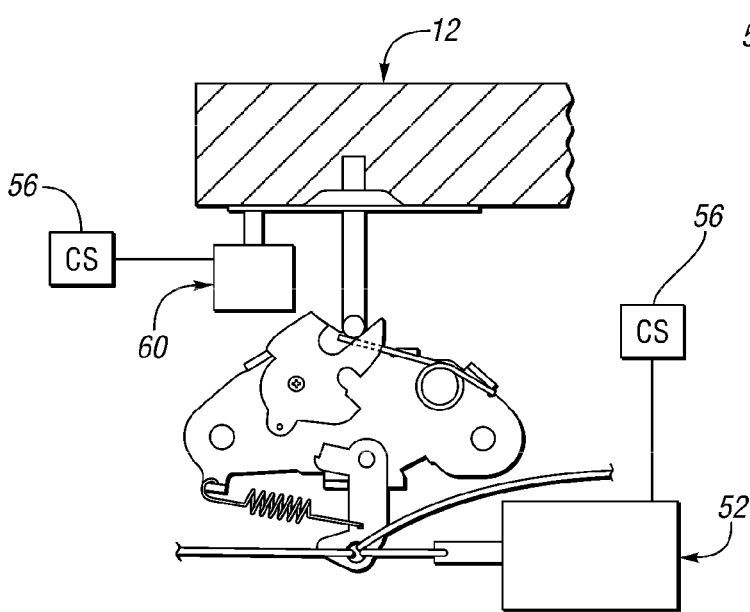
FIG. 5 is a front plan view of another aspect of the safety device shown in the deployed position.

Referring now to FIGS. 3-5, the safety device of the present invention is shown in an activated or deployed position. In the event of a collision between a vehicle 10 and a pedestrian 58, injury to the pedestrian 58 can be minimized if the vehicle hood 12 is unlatched and partially open when the pedestrian 58 comes into contact with the top surface of the vehicle hood 12.

In accordance with one aspect of the present invention, the forward section 26 of the vehicle may include one or more crash sensors 56 and act as a physical trigger in the event of a pedestrian collision. Alternatively, one or more crash sensors 56 may be positioned about the vehicle body to detect a rapid deceleration of the vehicle or if a portion of a pedestrian 58 comes into contact with the vehicle 10 during operation.

In the event of a collision between a vehicle and pedestrian, crash sensors 56 will detect one or more conditions indicative of a collision and transmit a signal to activate the primary hood release device or voice coil actuator 52. Upon activation, the voice coil actuator 52 will translate, causing cable 54 attached thereto to move pawl 42. Pawl 42 then rotates about latch bracket 30 through an angle sufficient to cause pawl 42 to release the locking cam 34 as shown in FIG. 4. Once locking cam 34 is disengaged, hood lift spring 50 biases against striker bar 40, causing hood 12 to move upward relative to the vehicle body.

It is contemplated that activation of the primary hood release device or voice coil actuator 52 may be delayed a period of time to delay release of the vehicle hood to maximize protection for the pedestrian. In one aspect of the present invention, voice coil actuator 52 will activate upon receipt of a signal from crash sensor 56, thereby causing hood 12 to raise in about 6 milliseconds or less.

It is also contemplated that the primary hood release device or voice coil actuator 52 can release to allow the pawl 42 to retract, thereby allowing hood 12 to be moved from an open or deployed position to a closed or latched position. An electronic system such as a controller 59 is configured for electrically communicating with both the crash sensors 56 and the primary hood release device 52. The controller 59 monitors the signal provided by the crash sensors 56 to determine whether if the impact condition is true or false. For example, should the vehicle impact a lightweight object or if the crash sensor emits a false signal, the controller 59 will determine that the that impact condition is false. Then the controller 59 will command the voice coil actuator 52 to actuate cable 54 connected to pawl 42, and secondary cable 48 if provided, thereby moving pawl 42 to its latched position illustrated in FIG. 5. Once placed in the latched position, pawl 42 will accept and secure locking cam 34 when striker bar 40 connected to hood 12 is translated downward by the closing of the hood 12. In one embodiment the primary hood release device 52 includes the controller 59.

Thus, as a user closes the hood 12 by pushing downward on it, the locking cam 34 will receive the locking portion 38 of the striker bar 40, and the locking cam 34 will rotate in a clockwise direction. When the locking cam 34 contacts the pawl 42, the pawl rotates far enough to allow the contacting portion of the locking cam 34 to pass by. Then spring 44 will force the pawl 42 to pivot back to the latched position illustrated in FIG. 2.

FIG. 5 illustrates another aspect of the present invention. A secondary hood release device 60 may be mounted adjacent the inner surface of the vehicle hood 12. Secondary hood release device 60 is configured to engage hood 12 upon receipt of a signal from one or more crash sensors 56. Secondary hood release device 60 provides additional hood lifting force and assists the hood lift spring 50 in raising hood 12. It is understood that secondary hood release device 60 may be a variety of pyrotechnic or non-pyrotechnic lifting devices, including, but not limited to, a voice coil actuator, spring, or pneumatic piston.

It is contemplated that the secondary hood release device 60 may include a voice coil actuator which provides a longer stroke than the voice coil actuator of the primary hood release device 52 to assist in raising the hood 12, especially in cases involving rapid deceleration of the vehicle, where the front end of the vehicle may dip, inducing a downward force component on hood. Alternatively, a spring or pneumatically activated piston may provide similar assistance to the primary hood release device 52 to release and lift the hood of the vehicle.

Secondary hood release device 60 may activate at the same time as primary hood release device 52. Alternatively, secondary hood release device 60 activate about 5 milliseconds after activation of the primary hood release device 52. The addition of the secondary hood release device 60 may help to accelerate and lift the hood assembly mass upward to about 3 inches at an increased velocity.

While the best mode for carrying out the invention has been described in detail, those familiar with the art to which this invention relates will recognize various alternative designs and embodiments for practicing the invention as defined by the following claims.

What is claimed:

1. A collision safety system for use with a motor vehicle, the system comprising:
    a hood mounted to the vehicle movable between an open position and a closed position extending at least partially over an opening in the vehicle, the hood including a striker bar extending therefrom;
    a latch mechanism positioned adjacent the hood releasably engaging the striker bar, the latch mechanism including a first spring operative to move the striker bar, a locking cam configured to releasably secure the striker bar and a pawl movable between a latched position engaging the locking cam and a deployed position away from the locking cam;
    a primary hood release device operatively connected to the pawl by a link;
    a remote source configured to transmit an activation signal to the primary hood release device to operate the pawl upon detection of an impact condition;
    an electronic system capable of determining if the activation signal is a true or a false impact condition; and
    a second spring operatively connected to the pawl;
    wherein the primary hood release device is a primary voice coil actuator which automatically actuates to move the pawl to release the locking cam upon receipt of the activation signal from the remote source allowing the first spring to engage and bias the striker bar such that the hood moves upward relative to the vehicle body;
    wherein, when the electronic system determines that the impact condition is false, the voice coil actuator automatically actuates to reposition the pawl to its latched position and the user can manually move the hood to the closed position, making the striker bar to engage and move the locking cam, the locking cam will contact the pawl so as to move the pawl enough to pass by, therefore, when the pawl is biased back to the latched position by the second spring, it will engage and latch the locking cam in order to lock the latch mechanism.

2. The collision safety system of claim 1 wherein the remote source further comprises one or more sensors disposed on the vehicle configured to detect an impact condition.

3. The collision safety system of claim 1 wherein the remote source further comprises a switch disposed in the vehicle.

4. The collision safety system of claim 1 further comprising a secondary hood release device disposed adjacent the hood in communication with the remote source operable to move the hood to the opened position upon receipt of a signal from the remote source.

5. The collision safety system of claim 4 wherein the secondary hood release device is a secondary voice coil actuator in communication with the primary voice coil actuator and activates based on the activation of the primary voice coil actuator.

6. The collision safety system of claim 5 wherein the secondary voice coil actuator activates about 5 milliseconds after activation of the primary voice coil actuator.

7. The collision safety system of claim 1 wherein the primary hood release device activates about 6 milliseconds after receipt of a signal from the remote source.

8. The collision safety system of claim 1 further comprising a manual release cable operatively connected to the pawl which operates in parallel to the primary hood release device to allow a vehicle operator to open the hood.

9. A safety device for use in combination with a hood of a motor vehicle, the system comprising:
    a latch bracket;
    a locking cam pivotally mounted to the latch bracket having a channel configured to releasably secure a striker bar extending from the hood;
    a torsion spring disposed on the latch bracket operable to engage and move the striker bar;
    a pawl movable between a latched position engaging the locking cam and a deployed position away from the locking cam;
    a primary hood release device operatively connected to the pawl by a cable, and in communication with one or more sensors, each of the sensors being configured to transmit an activation signal to the primary hood release device to operate the pawl upon detection of an impact condition;
    an electronic system capable of determining if the activation signal is a true or a false impact condition; and
    an extension spring operatively connected to the pawl;
    wherein the primary hood release device is a voice coil actuator which automatically actuates to move the pawl to release the locking cam upon receipt of the activation signal from the remote source allowing the torsion spring to engage and bias the striker bar such that the hood moves upward relative to the vehicle body;
    wherein, when the electronic system determines that the impact condition is false, the voice coil actuator automatically actuates to reposition the pawl to its latched position and the user can manually move the hood to the closed position, making the striker bar to engage and move the locking cam, the locking cam will contact the pawl so as to move the pawl enough to pass by, therefore, when the pawl is biased back to the latched position by the extension spring, the pawl will engage and latch the locking cam in order to lock the latch mechanism.

10. The safety device of claim 9 further comprising a secondary hood release device disposed adjacent the hood in communication with the one or more sensors operable to move the hood to the opened position upon detection of the impact condition.

11. The safety device of claim 10 wherein the secondary hood release device is a secondary voice coil actuator which is in communication with the primary voice coil actuator and activates based on the activation of the primary voice coil actuator.

12. The safety device of claim 10 wherein the secondary hood release device is a spring in communication with the primary voice coil actuator which actuates based on the activation of the primary voice coil actuator.

13. A safety device for use in combination with a hood of a motor vehicle, the system comprising:
a latch bracket;
a locking cam pivotally mounted to the latch bracket having a channel configured to releasably secure a striker bar extending from the hood;
a first spring disposed laterally offset from the channel on the latch bracket such that a free leg of the spring is operable to engage and move the striker bar;
a pawl movable between a latched position engaging the locking cam and a deployed position away from the locking cam;
a primary hood release device operatively connected to the pawl by a link, and in communication with one or more sensors, each of the sensors being configured to transmit an activation signal to the primary hood release device to operate the pawl upon detection of an impact condition, wherein the primary hood release device is a primary voice coil actuator;
an electronic system capable of determining if the activation signal is a true or a false impact condition;
a secondary hood release device disposed adjacent the hood in communication with the one or more sensors operable to move the hood to the opened position upon detection of the impact condition; and
a second spring operatively connected to the pawl;
wherein the primary and secondary hood release devices cooperate to automatically adjust the vertical position of the hood upon receipt of the activation signal indicating an impact condition from the one or more sensors;
wherein, when the electronic system determines that the impact condition false, the primary voice coil actuator automatically actuates to reposition the pawl to its latched position and the user can manually move the hood to the closed position, making the striker bar to engage and move the locking cam, the locking cam will contact the pawl so as to move the pawl enough to pass by, therefore, when the pawl is biased back to the latched position by the second spring, it will engage and latch the locking cam in order to lock the latch mechanism.

14. The safety device of claim 13 wherein the secondary hood release device is a secondary voice coil actuator in communication with the primary voice coil actuator and activates based on the activation of the primary voice coil actuator.

15. The safety device of claim 14 wherein the secondary voice coil actuator activates about 5 milliseconds after activation of the primary voice coil actuator.

16. The safety device of claim 13 wherein the secondary hood release device is a spring in communication with the primary voice coil actuator and activates based on the activation of the primary voice coil actuator.

17. The safety device of claim 13 wherein the primary voice coil actuator activates about 6 milliseconds after receipt of a signal from the one or more sensors.

18. The collision safety system of claim 1, wherein the latch mechanism is positioned adjacent to a leading edge of the hood.

* * * * *